L. L. WILSON.
ICE MANUFACTURING APPARATUS.
APPLICATION FILED JAN. 13, 1913.
1,068,723.
Patented July 29, 1913.
4 SHEETS—SHEET 2.
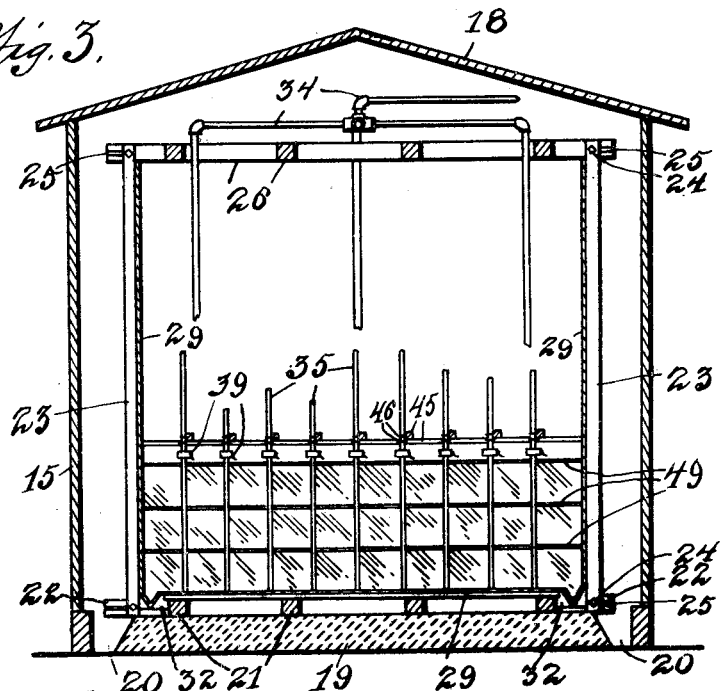
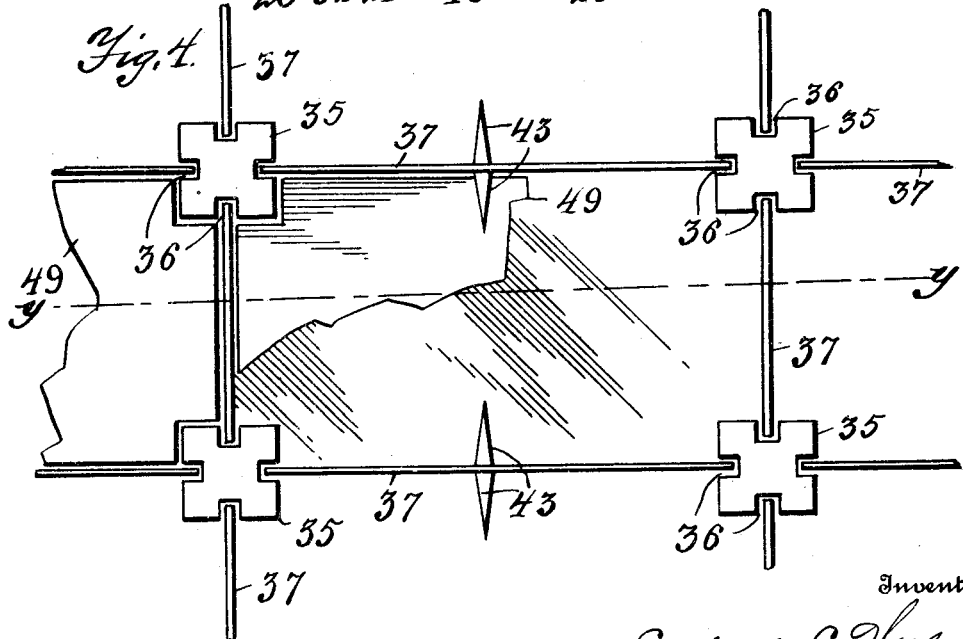
Witnesses
Arthur C. Morse
H. A. Sandberg
Inventor
Lydell L. Wilson
By J. Arthur Baldwin.
Attorney L. L. WILSON.
ICE MANUFACTURING APPARATUS.
APPLICATION FILED JAN. 13, 1913.
1,068,723.
Patented July 29, 1913.
4 SHEETS—SHEET 3.
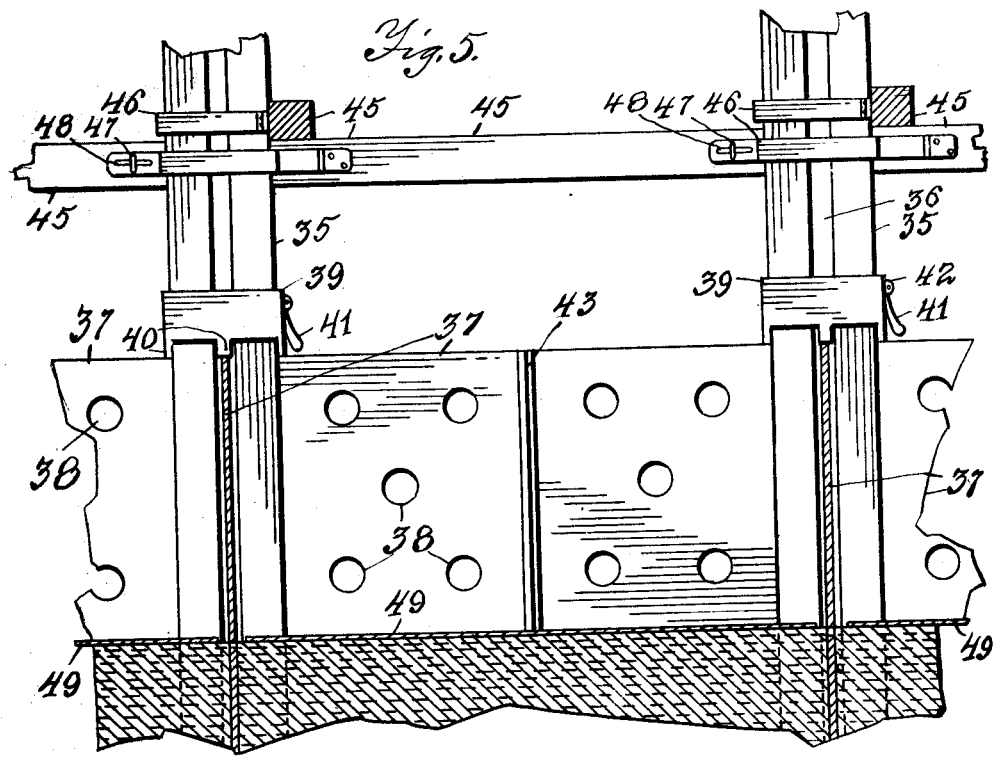
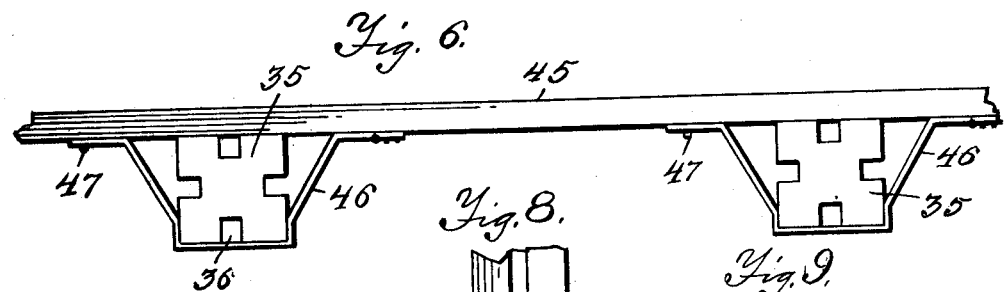
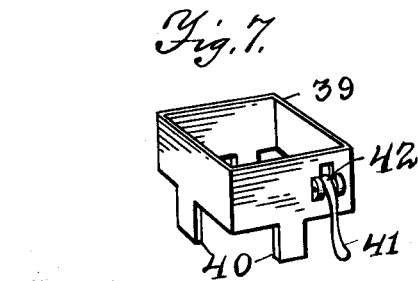
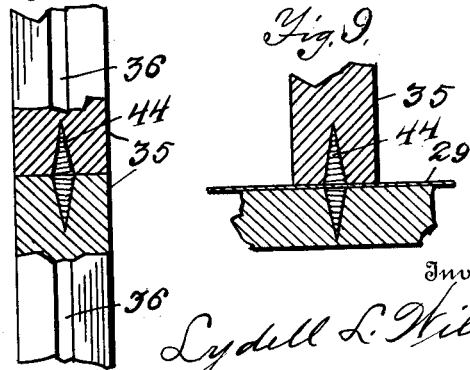
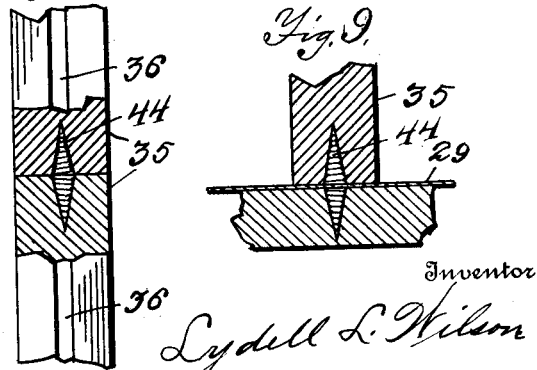

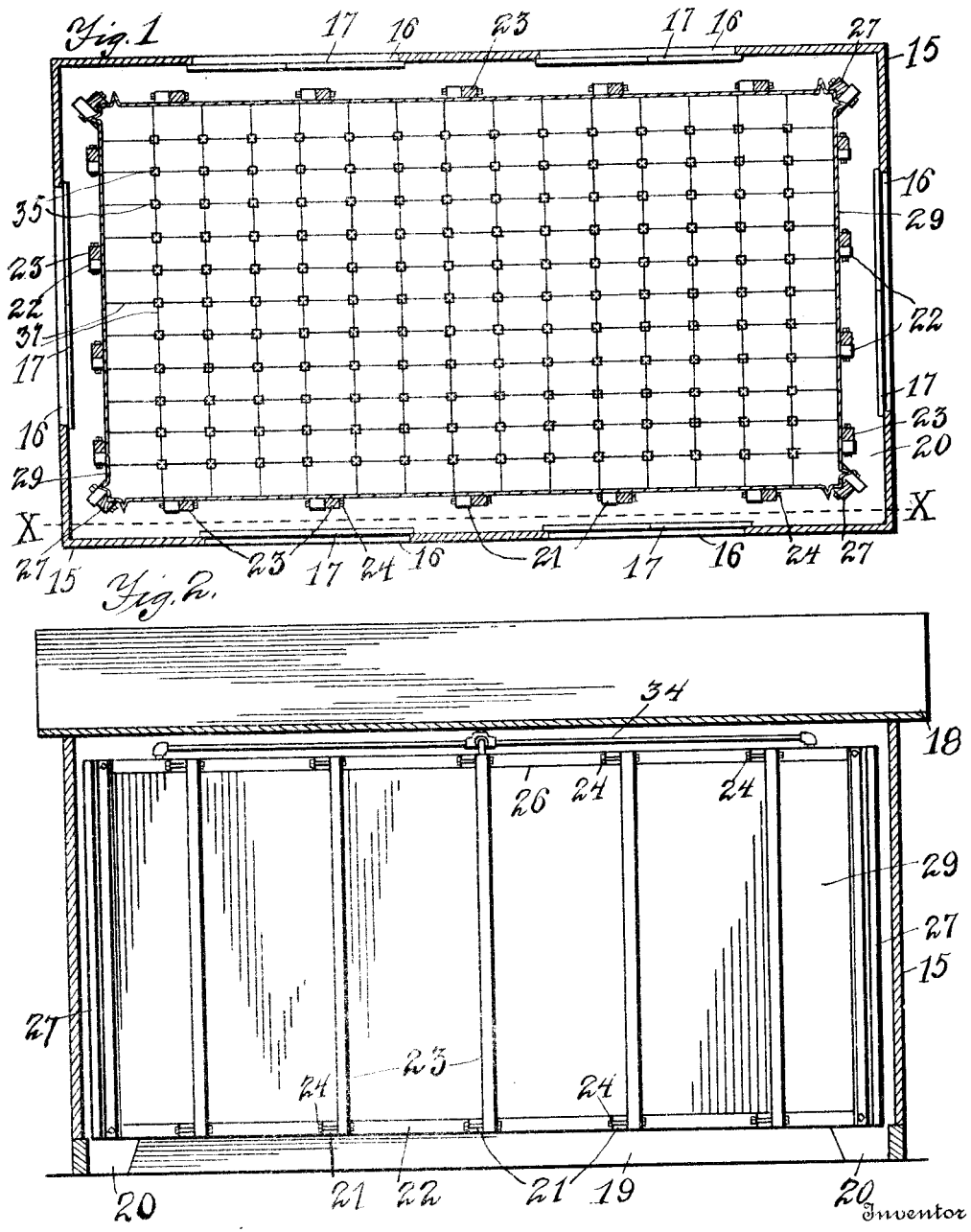

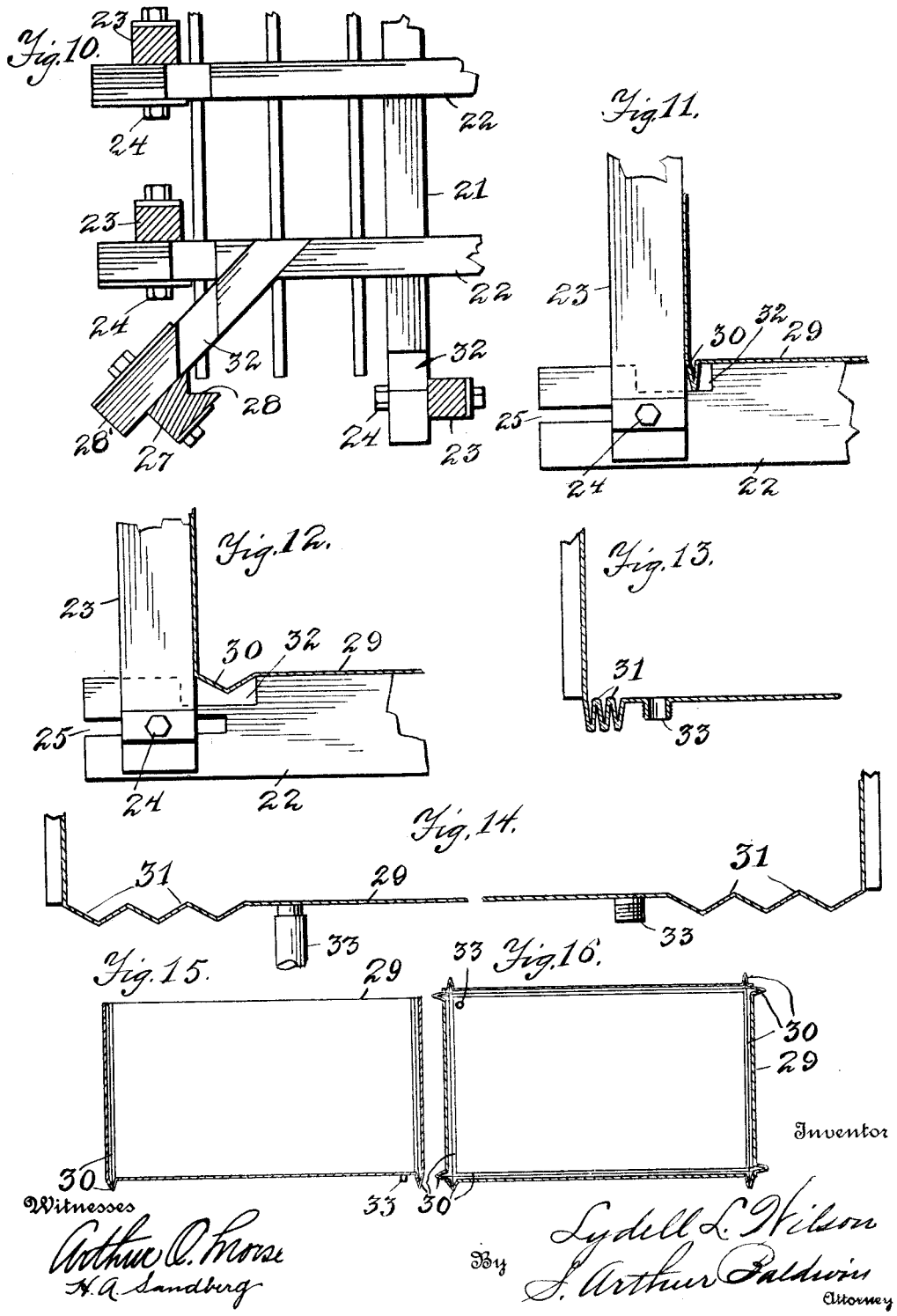

UNITED STATES PATENT OFFICE.

LYDELL L. WILSON, OF RANDOLPH, NEW YORK.

ICE-MANUFACTURING APPARATUS.

1,068,723.  Specification of Letters Patent.  Patented July 29, 1913.

Application filed January 13, 1913. Serial No. 741,652.

*To all whom it may concern:*

Be it known that I, LYDELL L. WILSON, a citizen of the United States, residing at Randolph, in the county of Cattaraugus and State of New York, have invented certain new and useful Improvements in Ice-Manufacturing Apparatus, of which the following, taken in connection with the accompanying drawings, is a specification.
The invention relates to ice houses and means connected therewith for the natural production of ice, and the improvement consists in providing a house having means for opening and closing the sides thereof and providing means within said house for building up molds for the ice in superimposed layers within a receptacle or tank having provision therein for the expansion of the ice in freezing; and the invention consists in the construction and combination of the parts as shown in this specification and the accompanying drawings and pointed out in the claims.

In the drawings, Figure 1 is a horizontal section of the ice house and tank therein and the supporting frame work for the tank, also with the division frame work within the tank for forming the molds for the ice cakes. Fig. 2 is a longitudinal vertical section on line X-X in Fig. 1 of the ice house, showing an elevation of the tank and supporting frame within the ice house. Fig. 3 is a crosswise vertical section of the ice house and ice molding means, showing three layers of the ice formed therein. Fig. 4 is a detail plan view of one of the set up molds with the corner posts; and Fig. 5 is a sectional view of the molds at line Y Y in Fig. 4, showing the manner of supporting the corner posts and the movable side and end boards for the molds with the openings therein for the water. Fig. 6 is a top plan view of the cross bars and corner posts for the molds, showing the manner of attaching the bars to said posts. Fig. 7 is a perspective view of one of the clamping irons which is slidably mounted on the corner posts for holding the side and end boards of the molds in place. Fig. 8 is a sectional view of a joint in the corner posts; and Fig. 9 is a sectional view of one of the corner posts, showing the manner of attaching the lower end to the floor of the receptacle. Fig. 10 is a plan view of a corner of the supporting frame for the ice holding tank or receptacle, showing the movable uprights of the frame in section. Fig. 11 is a detail showing the manner of attaching the uprights of the frame to the supporting slotted end of one of the bed pieces and showing the return bend or crimp in the ice holding receptacle or lining to provide for the expansion from freezing, the crimp being shown in the closed position; and Fig. 12 is a similar view showing the crimp in the opened position when the uprights and the side of the receptacle have been pushed out by the expansion of the ice. Fig. 13 shows a similar view with a plurality of folds or crimps in the sheet metal, preferably adjacent the outer sides of the frame, the folds being shown in the closed position; and Fig. 14 is a similar view of each side, showing the folds in the open position and also showing the discharge pipe for drawing off the water. Fig. 15 is a vertical sectional view of the tank showing the crimp or fold in the bottom and side adjacent the corners of the tank; and Fig. 16 is a crosswise sectional view of the tank showing the vertical crimps or folds adjacent the corners of the tank as well as the folds in the bottom along each side of the tank.

Like numerals of reference refer to corresponding parts in the several views.

The numeral 15 designates the ice house which is formed with the openings 16 having doors or other closures 17 for said openings and a suitable roof covering 18. A foundation 19 preferably of cement is provided, a spaced distance 20 being allowed between the foundation and the side walls of the ice house. Upon the foundation 19 suitable cross timbers 21 and 22 are laid which timbers extend a short distance beyond the sides of the foundation 19. Uprights 23 are attached to these projecting ends by means of suitable bolts 24 and the projecting ends of the cross beams 21 and 22 are slotted with open ended slots 25 to receive the bolt 24 so that the bolt may move outward from the inner end of the slot by the expansion of the ice. The upper ends of the uprights 23 are supported in a similar manner by a frame 26 so that the uprights 23 are free to move uniformly from end to end as they move outward. The corner posts 27 are provided with a V-shaped opening 28 on the inner side and are supported in such position that said V-shaped opening forms the exact corner of the opening for the tank 29 within the uprights 23. An angle piece 28' is preferably attached to the cross piece 22 and has a slotted end to permit the outward movement of the corner upright 27.

Within the frame formed of the cross pieces and uprights a tank or receptacle 29 is placed preferably made of galvanized sheet metal to hold the water when it is flowed into the tank for freezing. In order that the sheet metal receptacle 29 may accommodate itself to the expansion from freezing, a number of single crimps 30 are formed in the sheet metal bottom, preferably near the outer walls of the tank, and may also extend vertically near the corners in the side walls, thereby providing for movement of the walls of the tank in any direction. A plurality of crimps or folds 30 in place of the single crimp would not depart from my invention. A suitable opening 32 is provided in the cross sills 21 and 22 for the crimps 30 and 31, and it is apparent that with the slots 25 and crimps 30 or 31 the sides of the tank 29 may move outwardly with the uprights 23 and 27 without in any wise injuring the stability of said frame, the folds 30 and 31 gradually opening as required by the freezing ice.

A discharge pipe 33 or plurality of discharge pipes are provided in the bottom of the tank 29 for drawing off the water. In order to flow the water into the tank 29 a pipe 34 is provided above the tank and with branching arms preferably to the different quarters of the tank 29 in a large plant.

In order to form the ice into cakes of even size a series of built up molds is arranged within the tank 29 in the following manner: Uprights or corner posts 35 are provided having lengthwise grooves 36 central of each of the sides of each post to receive therein the ends of the boards 37 which form the sides and ends of the molds. The side boards 37 have preferably a plurality of openings 38 therein. The wooden upright posts 35 and sides 37 serve also an additional purpose of providing wooden parts within the ice so that as it freezes the large number of wooden parts will take a certain amount of expansion and aid in the control of the ice. A clamping iron 39 which extends around or is slipped onto the posts 35 and is fitted thereto with tongues 40 which bend into and travel within the grooves 36 is provided with a lever 41 having a cam-shaped end 42 so as to form a clamp of the iron 39 holding it at any desired position upon the post 35. The tongues 40 rest upon the upper edges of the side and end boards 37 holding them firmly in position. In order to easily divide the cakes of ice projecting wedge shaped pieces 43 are provided crosswise of the sides about midway of the length of the same.

In order to support the upright posts 35 the lower ends are fixed in position by means of a double or two way screw 44, as shown in Fig. 9, a joint or splice between the pieces of the corner posts is made in the same manner, as shown in Fig. 8. The upper ends of the posts 35 are held in exact position by means of a series of cross bars 45 which are attached to the posts 35 by means of a hinge strap piece 46 and a crosswise button 47 which is received through a slot 48 in the end of the strap 46 and then turned crosswise, as shown in Fig. 5. This holds the upright posts 35 in exact alinement parallel to one another so that the side and end boards 37 do not bind and the cakes of ice are made uniform.

In the manufacture of ice uprights 35 are set up within the tank 29 at exactly the spaced distances required for the molds and the first layer of molds is thus formed by means of the side and end boards 37 held in place by the clamping irons 39, the upper ends of the posts 35 being held in position by the cross bars 45. The water is then run into the molds seeking its own level and filling the molds to the top of the sides 37. The openings 16 in the sides of the ice house are then opened to permit the outside atmosphere to circulate freely through the ice house, freezing the water and forming the first layer of ice cakes in the bottom of the tank 29. The crimps or folds 30 or 31 provide for the expansion of the ice as it forms in the process of freezing. As soon as the first layer of ice cakes is formed the clamps 39 are slipped upward on the corner posts 35 a sufficient distance and a second layer of side and end boards 37 and a division board 49 is placed over the cakes of ice to divide horizontally between the successive layers or cakes of ice, after which the water is again run into the molds filling the same for the second and succeeding layers of ice cakes. After the entire receptacle 29 is filled, the ice house may be closed and the ice packed or otherwise protected as desired within the space around the receptacle 29.

In order to separate the side and end boards 37 from the ice cakes in taking out the cakes it has been found desirable to soak the side and end boards and the corner posts in a strong salt brine a sufficient length of time to thoroughly impregnate the wood, the action of the salt on the ice aiding in the separation of the wood from the ice cakes.

The holes 38 in the side and end boards 37 are not absolutely necessary and may be dispensed with without departing from my invention.

After all the ice has been removed from the ice house the side walls of the tank are pressed back inward so as to close the crimps or folds 30 or 31 both in the ends, sides and bottom so that the tank will be ready for filling again with the coming of freezing weather.

In order to remove the ice from the tank 29 an opening is made in the side or end of the tank by two vertical cuts in the sheet metal, rolling up the sheet metal so cut away, and after the removal of the ice these cuts are closed by soldering a strip of metal over the same.

I claim as new—

1. A device of the class described comprising a receptacle arranged to permit the expansion of the walls of said receptacle in the formation of ice, and suitable supports for the walls of said receptacle arranged to permit said expansion of said walls.

2. A device of the class described comprising a sheet metal tank, a supporting frame for said tank, uprights in said frame arranged to permit outward movement of the same from the expansion of said tank, and folds in the sheet metal of said tank adjacent the corners thereof to permit the expansion of said tank from the freezing of the water.

3. A device of the class described comprising a tank arranged to permit the expansion of the side walls thereof from the freezing of water within the same, a supporting frame for said tank having cross timbers with slotted ends, and upright timbers bolted within said slotted ends to permit the outward movement of said upright timbers from the expansion of said tank.

4. A device of the class described comprising a receptacle, horizontal folds or crimps adjacent the horizontal corners of said receptacle and vertical folds or crimps adjacent the vertical corners of said receptacle to permit the expansion of the side walls of said receptacle from pressure from within outward, and means for supporting said receptacle permitting said outward movement.

5. A device of the class described comprising a receptacle for holding water to be frozen, built-up molds within said receptacle consisting of vertical posts having lengthwise grooves therein, means for holding said posts in a vertical position, and side and end boards slipped into said grooves in said posts to be supported in the upright position.

6. A device of the class described comprising a receptacle for holding water to be frozen, built-up molds within said receptacle consisting of vertical posts having lengthwise grooves therein, means for holding said posts in a vertical position, side and end boards slipped into said grooves in said posts to be supported in the upright position, and a clamp fitted to slide over said posts to hold said side and end boards in position.

7. A device of the class described comprising a receptacle for holding water to be frozen, built-up molds within said receptacle consisting of vertical posts having lengthwise grooves therein, means for holding said posts in a vertical position, side and end boards slipped into said grooves in said posts to be supported in the upright position, a clamp comprising a band extending around said posts and having tongues on the lower sides thereof to rest upon said side and end boards, and means for clamping said bands in a fixed position upon said posts to hold said boards.

8. A device of the class described comprising a receptacle for holding water to be frozen, built-up molds within said receptacle consisting of vertical posts having lengthwise grooves therein, means for holding said posts in a vertical position, side and end boards slipped into said grooves in said posts to support the same in the upright position, a clamp to hold said side and end boards comprising a band around said posts, and a cam ended lever mounted in said band to fixedly hold said band on said post, substantially as and for the purpose specified.

9. A device of the class described comprising a receptacle for holding water to be frozen, built-up molds within said receptacle consisting of vertical posts having lengthwise grooves therein, lengthwise and crosswise bars removably attached to said posts to hold them in the upright position, side and end boards slipped into said grooves in said posts to support the same in the upright position, said side and end boards having openings therein.

10. A device of the class described comprising a receptacle for holding water to be frozen, built-up molds within said receptacle consisting of vertical posts having lengthwise grooves on each side thereof, side and end boards slipped into said grooves in said posts to support the same in the upright position, lengthwise and crosswise bars to support said posts in exact position, and hinged strap pieces on said bars to engage said posts, substantially as and for the purpose specified.

11. A device of the class described comprising a receptacle for holding water to be frozen, crimps or folds in said receptacle permitting the outward movement of the side walls thereof, built-up molds within said receptacle consisting of vertical posts having lengthwise grooves central of each side thereof, cross bars to support said posts in exact relation to one another, hinged strap pieces on said cross bars to attach the same to said posts, side and end boards for said molds engaging said lengthwise grooves in said posts with their respective ends to form molds therewith, and horizontal division boards fitting within said posts between the successive layers of cakes of ice, substantially as and for the purpose specified.

In testimony whereof I have affixed my signature in the presence of two witnesses.

LYDELL L. WILSON.

Witnesses:
H. A. SANDBERG,
ARTHUR O. MORSE.